O. A. PARKER.
AUTOMOBILE WHEEL.
APPLICATION FILED MAR. 6, 1917.

1,376,826.

Patented May 3, 1921.
2 SHEETS—SHEET 1.

Inventor
Orrel A. Parker
by Hull Smith Brock & West
Attys.

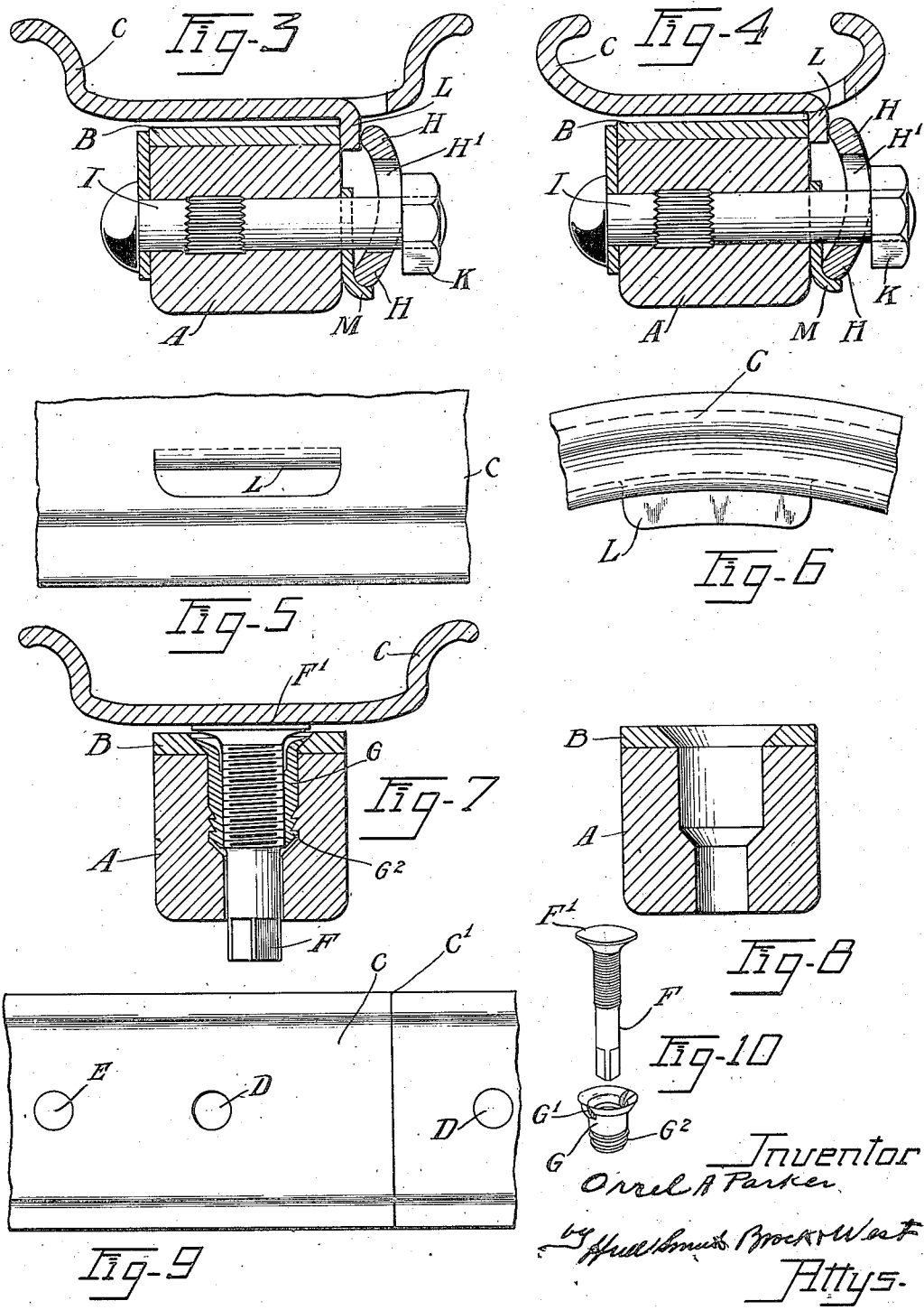

UNITED STATES PATENT OFFICE.

ORREL A. PARKER, OF CLEVELAND, OHIO.

AUTOMOBILE-WHEEL.

1,376,826.	Specification of Letters Patent.	Patented May 3, 1921.

Application filed March 6, 1917. Serial No. 152,795.

*To all whom it may concern:*

Be it known that I, ORREL A. PARKER, a citizen of the United States, residing at Cleveland, in the county of Cuyahoga and State of Ohio, have invented a certain new and useful Improvement in Automobile-Wheels, of which the following is a full, clear, and exact description, reference being had to the accompanying drawings.

This invention relates generally to automobile wheels and more particularly to certain improvements applicable to the wheel and demountable rim covered by Letters Patent No. 1,188,200 granted to me June 20, 1916.

The object of the present invention is to provide a wheel, rim, and fastening means so constructed and arranged that a minimum number of parts will be required to securely fasten the rim upon the wheel body properly centered and in a true plane.

This reduction in the number of parts materially reduces the cost of manufacture and the time and labor of mounting and demounting the rim, and the parts owing to their construction and arrangement all work toward security and accuracy in the final adjustment.

With these objects in view and certain others which will become apparent as the description proceeds the invention may be said to consist in the novel features of construction and arrangement hereinafter fully described and set forth in the appended claims.

Figure 1:
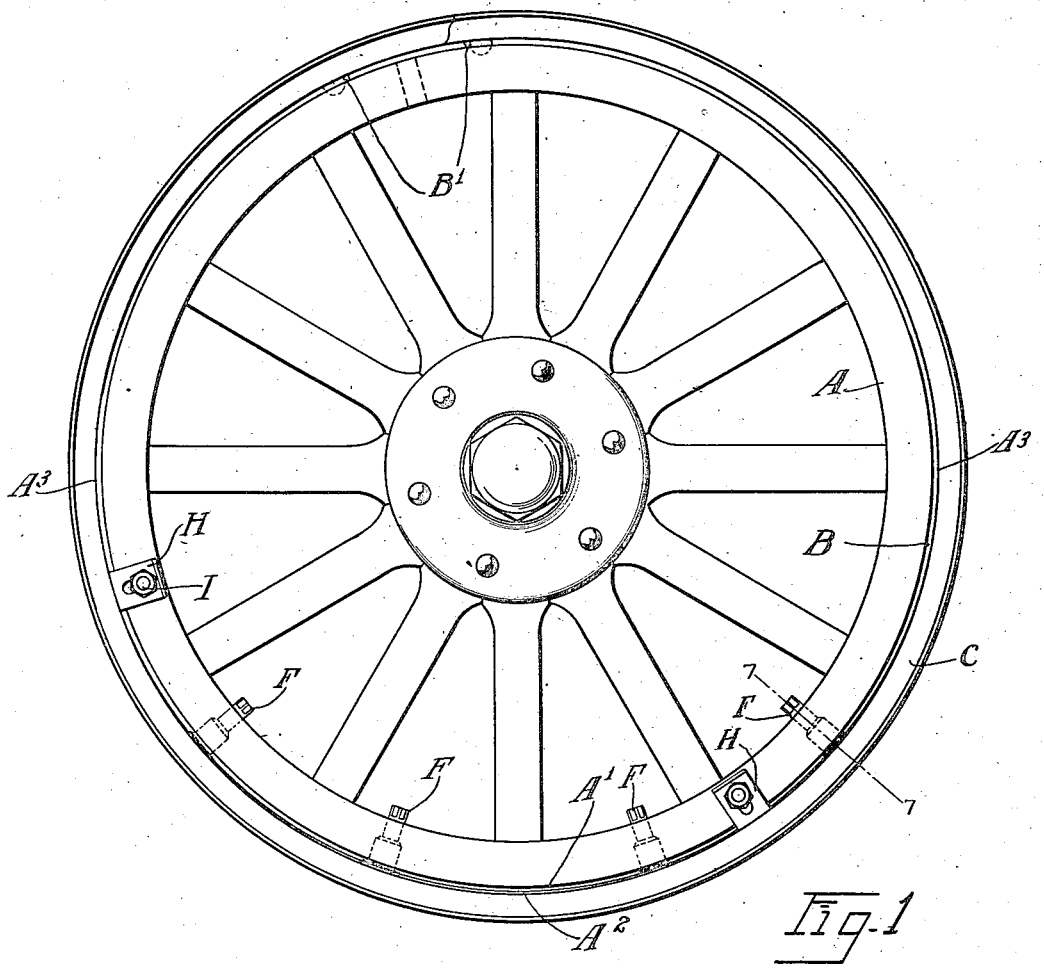
Figure 2:
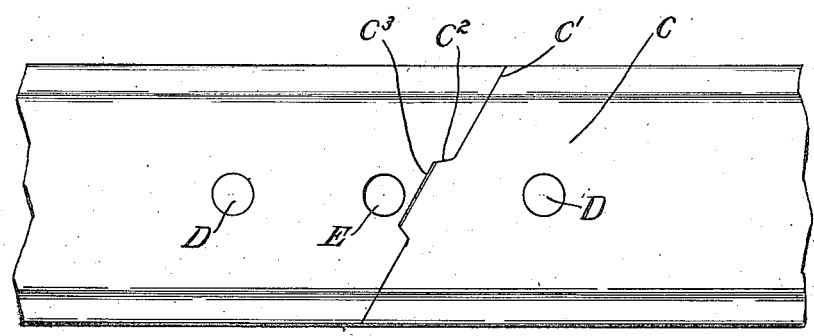

In the drawings forming a part of this specification Figure 1 is a face view of a wheel body and demountable rim embodying my invention; Fig. 2 is a detail face view showing the meeting ends of the trans-split demountable rim having a diagonal cut; Fig. 3 is a sectional view illustrating a straight side rim clamped upon the wheel felly; Fig. 4 is a similar view of a clencher rim; Fig. 5 is a detail plan view showing a position of the rim viewed from above at the lateral clamp as shown; Fig. 6 is a side elevation of a portion of the rim; Fig. 7 is a sectional view on the line 7—7 of Fig. 1; and Fig. 8 is a detail sectional view of the felly and band and showing the shape of the openings therein to receive the radial bolt and bushing; and Fig. 9 is a detail view of a trans-split rim having a right angle cut; and Fig. 10 is a view of the bolt and bushing.

In carrying out my invention I employ a wheel body A which may be described as semi-eccentric, that is about half of the periphery of this wheel body is concentric and the other portion of the periphery is made slightly eccentric by removing a very small part from the outer face of the felly as indicated at A' in order that the demountable tire carrying rim C may be freely and easily rocked or buttoned on and off.

If desired this eccentricity in the wheel body could be obtained with slight inaccuracies by making the wheel as a whole, a true circle and placing the hub bore slightly to one side of the true center of the said wheel body.

A metallic felly band B is fastened upon the wheel body in the usual or any approved manner and conforms to the eccentricity of said wheel. This wheel body, which as previously stated may be described as semi-eccentric is intended to receive thereon a tire carrying rim C which is as near a true circle as such rims are made commercially and this rim can be of the clencher, straight side, or any other type and either continuous or transversely or circumferentially split as preferred and in case a trans-split rim is employed said split can be either diagonal or at right angles as desired. When the tire carrying rim is placed upon the wheel body substantially half of said rim will be in close or intimate contact with said wheel body while substantially the other half of the rim will be out of contact with the wheel body owing to the fact that that portion of the wheel body is slightly eccentric and the rim supported by radial screws.

The tire carrying rim C has dowels or driving lugs D upon opposite sides of the split C' in case the rim is of the trans-split type and the rim is also provided with a valve stem opening E through which the valve stem of the inner tube is passed, there being a corresponding opening in the wheel body to receive the said valve stem.

In case the rim is diagonally split one end is preferably constructed with a central extension $C^2$ which is adapted to enter a correspondingly shaped recess or notch $C^3$ produced in the opposite end, the purpose of this construction being to prevent the lateral displacement of the rim ends. When the rim is split at right angles as shown in Fig. 9 no such construction will be necessary. The dowels or driving lugs D enter recesses B' produced in the felly band and these recesses and driving lugs are so positioned that when the rim is placed upon the wheel body with the driving lugs in the recesses, that portion of the rim will be properly positioned upon the wheel body and will be so held at all times, securely against both lateral and circumferential movement, and at the same time the rim can not spread open at the split.

When a right angled split is used as shown in Fig. 9, the valve stem hole E is preferably placed a short distance away from the split end of the rim C', and beyond the lug, but it will be understood that the position of the valve stem hole has nothing whatever to do with the efficient operation of the rim and fastening means. The recesses in the felly band for receiving the driving lugs are preferably made in the concentric portion of the wheel body and as before stated when the rim is placed upon this wheel body substantially half of the rim contacts with the concentric portion of the wheel body while the other half of the rim will fall freely around the eccentric portion, there being a clearance between the felly band and rim due to the eccentricity of the wheel body, this clearance being greatest at the middle of the eccentric portion as shown at $A^2$ and gradually diminishing toward each side until the clearance becomes lost at the points where the eccentric merges into the concentric portion of the wheel body as shown at the points $A^3$ and $A^3$.

For the purpose of tensioning the rim, taking up this clearance, and drawing the rim firmly about the concentric portion of the wheel body I employ radial bolts F (four being shown) which pass through the eccentric portion of the felly and band and bear against the contiguous portion of the demountable rim. These bolts F have substantially flat heads F' which bear against the inner face of the rim as most clearly shown in Figs. 1 and 7. These bolts F work through internally threaded bushings G which are inserted in the felly of the wheel body, the felly band having a countersunk opening to receive the flanged end of the bushing. The exterior of the bushings are formed in any suitable manner to prevent pulling out or rotating. The form shown has ears G' on each side which fit into corresponding notches in the felly band, and is also provided with circumferential barbs or grooves $G^2$ to catch in the wood of the felly. The bolt projects through the felly of the wheel body between the spokes and has its inner end shaped to receive a wrench whereby the bolts can be turned to move in or out as desired.

In order to prevent lateral displacement of the eccentric portion of the rim and also to aid in positioning the rim to a true plane I provide lateral clamps H upon bolts I passing through the felly and carrying nuts K for binding the lateral clamps in contact with the rim, said rim preferably having an inwardly projecting tongue L punched therefrom, the corners of the tongue being preferably rounded in order to avoid any sharp points. The clamp H is preferably provided with an elongated bolt hole H' so that when the nut K is loosened said clamp can be quickly dropped out of contact with the tongue L so that the rim can be quickly and easily removed from the wheel body. The lateral clamp H is preferably fulcrumed upon a clamp plate M fastened to the outer face of the felly and provided with a suitable ledge or flange against which the lateral clamp rests and fulcrums. It will be noted that the clamp H is curved the same at each side as indicated at H and H so that it is reversible, and that when properly positioned the portion of the nut K above the axis of the bolt and nut will come in contact with the clamp, this arrangement serving to increase the leverage pressure upon the clamp and correspondingly relieve the bolt from excessive lateral strains.

Owing to the fact that both ends of the clamp are curved alike it is impossible to place said clamp in an inoperative position. When the clamp H is positioned upon the plate M and the nut tightened so as to bring the clamp into contact with the tongue L, said tongue will be forced into contact with the felly band thereby serving as a lateral stop to properly position that portion of the rim remote from the dowels and then by tightening the nut upon the bolt the clamp will be securely fastened and will hold the rim against outward lateral movement, the tongue contacting with the felly band holding the same against inward lateral movement and the dowels previously referred to, hold the remaining portions of the rim against both lateral movement in either direction and circumferential movement. The radial bolts are then turned to contact with the rim, tensioning the same as a whole and drawing down tightly that portion which contacts with the concentric part of the wheel. In practice I have found two lateral clamps in connection with four radial screws and two dowels to be ample to properly position and tension a trans-split demountable tire carrying rim with the ends properly secured and the rim centered and in a true plane, thus eliminating the number of parts heretofore deemed necessary and consequently providing a saving in the cost of manufacture and also materially reducing the time and labor required to mount or demount the demountable tire carrying rim. It is, of course, obvious that only one dowel is necessary when the rim is not trans-split.

Having thus described my invention, what I claim is:—

1. The combination with a demountable tire carrying rim having an integral inwardly projecting tongue at one side thereof, said rim carrying a driving lug at a point substantially opposite said integral lug of a wheel body upon which said rim is adapted to fit, one half of said wheel body being eccentric, the driving lug of said rim being adapted to engage the concentric portion of the wheel body and the integral lug being adapted to be brought into engagement with the eccentric portion of said wheel body, an axial bolt and clamp carried thereby for holding said integral lug in engagement with said wheel body and a radial bolt passing through the eccentric portion of the wheel and adapted to engage the rim and tension the same.

2. The combination with a demountable tire carrying rim provided with driving lugs and having an integral inwardly projecting tongue at one side of said rim at a point remote from said driving lugs, a wheel body one half of which is concentric and the other half eccentric, the driving lugs being adapted to engage the concentric portion and the integral tongue adapted to engage the eccentric portion, a bolt passing through the eccentric portion of a wheel body, a clamp arranged thereon and adapted to hold the integral tongue in engagement with the wheel body, means carried by said wheel body and upon which said clamp bears, a radial bolt passing through the eccentric portion of the wheel body and adapted to engage the rim and tension the same, and a threaded sleeve secured in said eccentric portion of the wheel body and through which the radial bolt works.

3. In a device of the kind described the combination with a felly and felly band having registered openings therein the opening in the felly band being counter-sunk, a bushing provided with external barbs located in the opening in the felly, said bushing having an enlarged outer end adapted to fit in to the countersunk opening in the felly band, said enlarged end also having laterally projecting ears, and a bolt working in said bushing having a flat head, the outer end of said bushing being countersunk to receive said head.

4. In a device of the kind described, a demountable tire carrying rim having a portion of the base thereof adjacent the forward side punched therefrom and turned radially inward and brought into a plane substantially parallel with the plane of the wheel.

5. In a device of the kind described, a tire carrying rim having an integral inwardly projecting tongue punched therefrom at one side of said rim, the corners of said tongue being rounded.

In testimony whereof, I hereunto affix my signature.

ORREL A. PARKER.